J. G. McCARTHY.
EGG CASE FILLER OR CONTAINER FOR FRAGILE ARTICLES.
APPLICATION FILED MAR. 7, 1914.

1,159,400.  Patented Nov. 9, 1915.

WITNESSES:
Leonora Hatts
August H. Kirchner

INVENTOR
James G. McCarthy

COLUMBIA PLANOGRAPH CO., WASHINGTON, D. C.

UNITED STATES PATENT OFFICE.

JAMES G. McCARTHY, OF NEW YORK, N. Y.

EGG-CASE FILLER OR CONTAINER FOR FRAGILE ARTICLES.

1,159,400.          Specification of Letters Patent.          Patented Nov. 9, 1915.

Application filed March 7, 1914. Serial No. 823,116.

*To all whom it may concern:*

Be it known that I, JAMES G. MCCARTHY, of 29A South Portland avenue, of the borough of Brooklyn, county of Kings, city and State of New York, have invented a certain new and useful Improvement in Egg-Case Fillers or Containers for Fragile Articles, of which the following is a specification.

For a better understanding of the invention reference may be made to the accompanying drawings in which—

Figure 1:
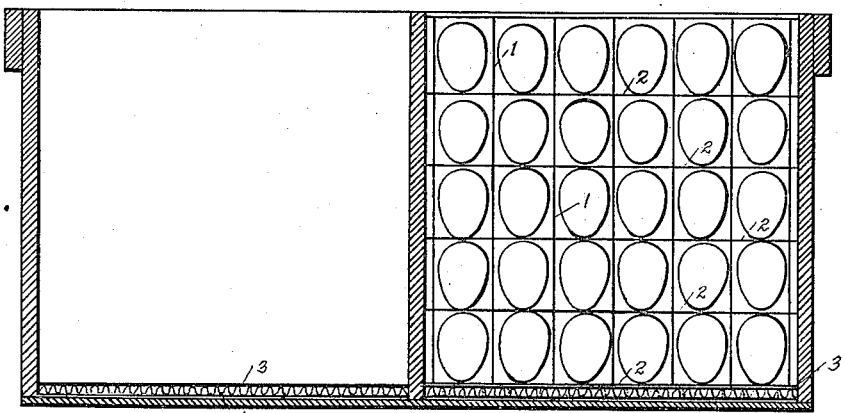
Figure 2:
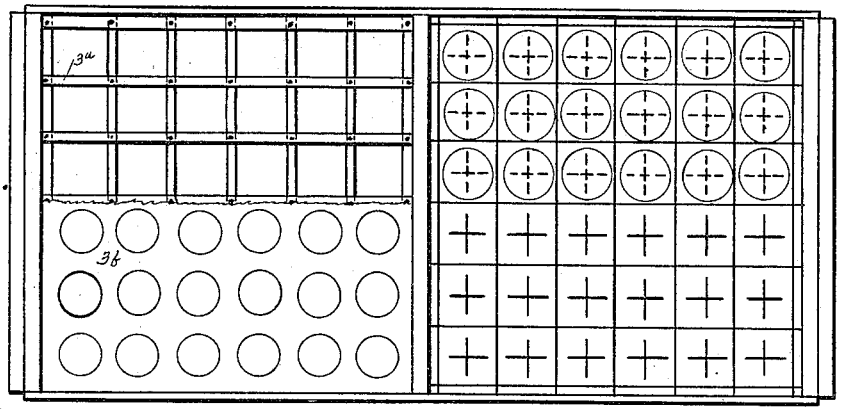
Figure 3:
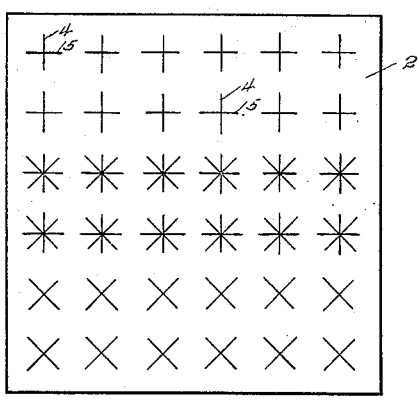
Figure 4:
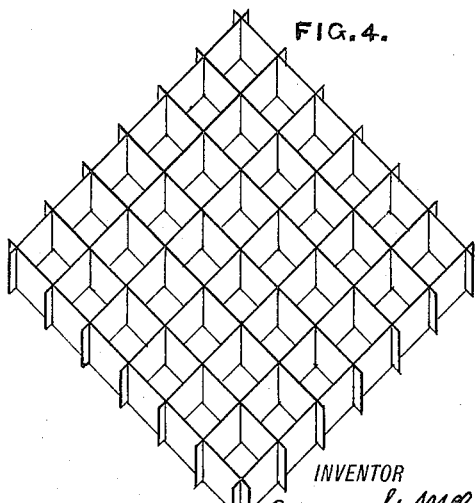

Figure 1 is a section of a standard egg crate in front elevation one side of which is shown as arranged in accordance with my invention, and filled with eggs. Fig. 2 is a plan view of an egg crate with the nests in square, and about two and one-quarter inches deep. Under the jar of shipment the eggs are shaken up and down and are broken, as I find against the unyielding bottoms formed by the pasteboard separators.

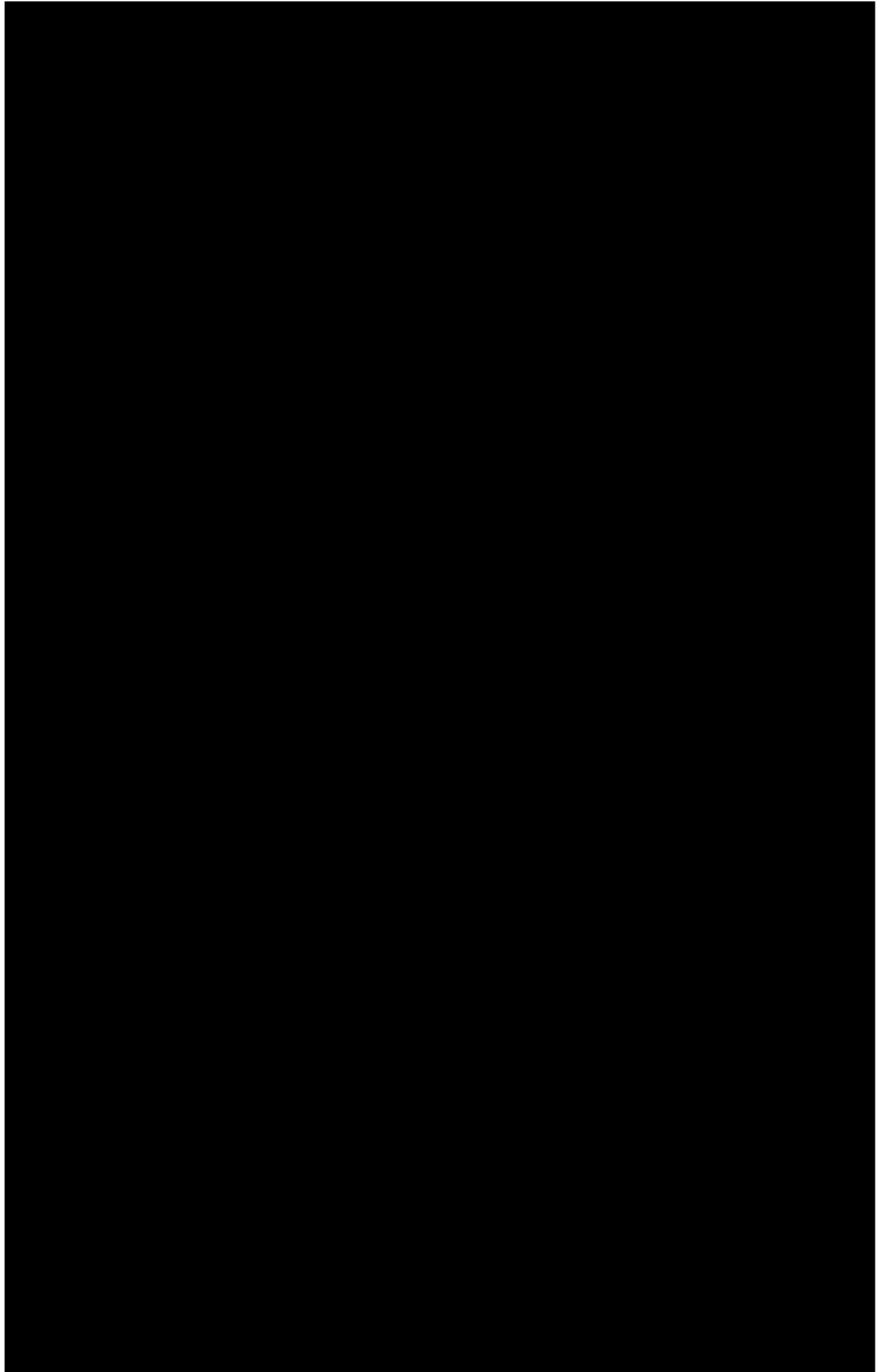

The object of my invention is to produce a yielding, elastic, supporting device for each individual egg, which will not require change in existing standard methods of shipping, and which can be produced at a sufficiently low cost to permit of its economical use as a substitute for the cardboard sheets now used. I find that these results can be obtained to a remarkable degree by the structure herein described. To this end my invention consists in the combination